United States Statutory Invention Registration [19]

[11] Reg. Number: H867

Hill [43] Published: Jan. 1, 1991

[54] TANDEM WARHEADS SEPARATED BY MISSILE BOOSTER MOTOR

[75] Inventor: Scott D. Hill, Toney, Ala.

[73] Assignee: The United States of America as represented by the Secretary of the Army, Washington, D.C.

[21] Appl. No.: 564,830

[22] Filed: Jul. 23, 1990

[51] Int. Cl.[5] ..... F42B 12/10; F42B 15/10

[52] U.S. Cl. ..... 102/374; 102/308; 102/476

*Primary Examiner*—Harold J. Tudor

*Attorney, Agent, or Firm*—Freddie M. Bush; James T. Deaton

[57] ABSTRACT

A tandem warhead arrangement that has a booster motor mounted between first and second warheads with the booster motor providing penetrator structure for the second warhead and a blast shield portion for protecting the second warhead from the blast of the first warhead.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TANDEM WARHEADS SEPARATED BY MISSILE BOOSTER MOTOR

DEDICATORY CLAUSE

The invention described herein may be manufactured, used, and licensed by or for the Government for governmental purposes without the payment to me of any royalties thereon.

BACKGROUND OF THE INVENTION

In the past, packaging of various components in small missiles has been difficult due to the length and volume constraint imposed by the system. Therefore, efficient packaging is extremely important to most systems. The second warhead must be protected from the blast of the first warhead. With the requirements in mind and the compact packaging of components in mind, if this space between the first and second warhead could be more efficiently utilized, this would aid in the packaging and aid in reducing the overall weight of the missile.

Accordingly, it is an object of this invention to provide a tandem warhead arrangement that utilizes a booster rocket motor between the tandem warheads to act as a shield for the second warhead and to act as a penetrator for the second warhead.

Another object of this invention is to provide a more compact packaging arrangement that allows the second warhead of the tandem warhead arrangement to be of a variety of configurations depending on the particular application that the tandem warheads are to be used against.

Other objects and advantages of this invention will be obvious to those skilled in this art.

SUMMARY OF THE INVENTION

In accordance with this invention, a tandem warhead arrangement is provided in which a booster motor is placed between first and second warheads of tandem warheads with the booster motor front portion acting as a blast shield for protecting the second warhead from the blast of the first warhead and with a rear portion of the booster motor acting as a penetrator for the second warhead.

DESCRIPTION OF THE PREFERRED EMBODIMENT

Figure 1:
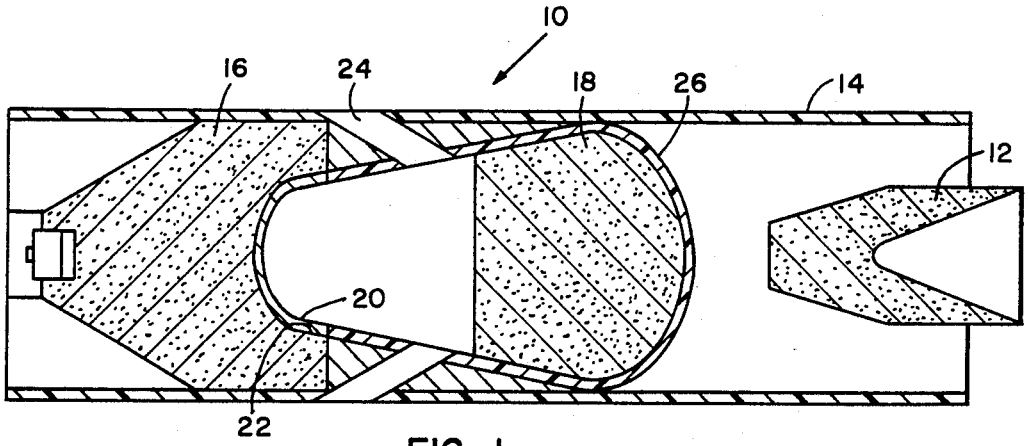
FIG. 1 is a sectional view illustrating a tandem warhead arrangement in which a booster motor is mounted between tandem warheads and illustrating the relationship of a rear end of the booster motor to a warhead explosive charge.
Figure 2:
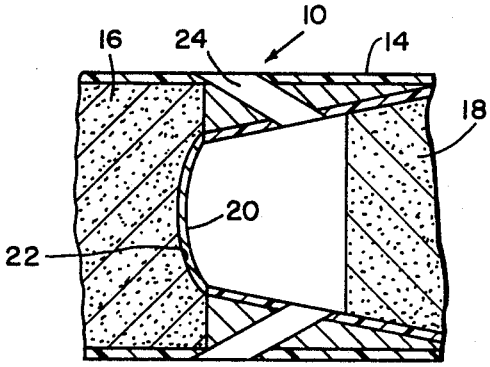
FIG. 2 is a schematic sectional view illustrating another shaped warhead explosive change that is configured to a base portion of a booster motor.
Figure 3:
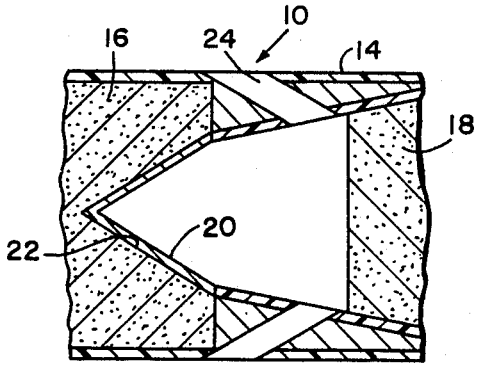
FIG. 3 is a schematic sectional view illustrating still another shape of an explosive charge of a warhead relative to the rear end portion of a booster motor.

Referring now to the drawings, a tandem warhead arrangement 10 includes first warhead 12 mounted in housing 14 in a conventional manner and second warhead 16 mounted in housing 14 in a conventional manner. A missile booster motor 18 of conventional structure is mounted between first warhead 12 and second warhead 16. Rear end 20 of booster motor 18 is shaped to conform to front end 22 of rear warhead 16. The rear end 20 of booster motor 18 and front end 22 of rear warhead 16 can take various shapes as illustrated in FIGS. 1, 2 and 3 depending upon the particular penetrator blow that rear warhead 16 is to deliver to a target. Booster motor 16 has exhausts 24 that exhaust out the side of missile housing 14. Front end 26 of booster motor 18 acts as a blast shield for protection of rear charge 16 from the explosive blast from front charge 12. By utilizing the rear end portion 20 of booster motor 18 to form the penetrator for rear explosive charge 16 and by having front portion 26 of booster motor 18 act as a blast shield, this allows for much more compact packaging and a reduction in the weight of the overall system. Rear portion 20 of booster motor 18 is preferably made of a metal such as steel to form the penetrator and the remainder of the housing of booster motor 18 can be made of metal or of composite materials This is the case since composite materials have sufficient strength for supporting the booster motor as well as acting as a blast shield.

There are at least two major advantages in using a system of tandem warheads with a booster motor mounted there between. As disclosed herein, the first advantage is that the standoff from the warhead to a target is in a more optimum range for target systems that have an ogive assembly that provides from two to three calibers of standoff. The optimum performance for conic charges as illustrated in FIG. 3 is typically between 6 to 8 calibers of standoff. For hemispherical charges as illustrated in FIG. 1 the optimum is typically between 6 and 10 caliber. For explosively formed penetrators, the optimum is between about 8 and 30 calibers. This system therefore allows the standoff to be increased by the length of the majority of the missile structure. The second major advantage of a tandem warhead as illustrated in this invention is that the missile can easily incorporate a front warhead which is detonated first. Front warhead 12 clears away advance armors which could otherwise degrade warhead performance if only one warhead is used. The metal structure of booster motor 18 provides a penetrator for rear explosive charge 16 which is set off at some time delay that allows advance armor to clear before rear charge 16 does its damage.

The materials use to form the housing for booster motor 18 is important in the tandem warhead performance. The materials typically used are maraging steels or metal and composite windings. The materials used in lined warheads vary, such as copper, aluminum, iron or steel, nickel, or various heavy metals. Any of these can perform and contain the pressures of booster motor 18 and can be used to form end portion 20 of booster motor 18. The exact materials to be use in booster motor 18 depends on the particular application that the device is to be used for.

We claim:

1. A missile having a tandem warhead assembly comprising, a housing, first and second warheads mounted in said housing with a booster motor mounted between said first and second warheads, said booster motor having a rear portion that conforms in shape to a front portion of said second warhead to act as a penetrator for the second warhead.

2. A missile having a tandem warhead assembly as set forth in claim 1, wherein said booster motor has a front portion that acts as a blast shield for protection of said second warhead from the blast of said first warhead.

3. A missile having a tandem warhead assembly as set forth in claim 2, wherein said booster motor has a rear section that is made of metal with the remainder of said booster motor being made from composite material.

4. A missile having a tandem warhead assembly as set forth in claim 3, wherein said second warhead has a front surface that is hemispherical in shape.

5. A missile having a tandem warhead arrangement as set forth in claim 3, wherein said second warhead has a front surface that is conical in shape.

6. A missile having a tandem warhead arrangement as set forth in claim 3, wherein said second warhead has a front shape that is a shallow disk like shape.

* * * * *